(12) United States Patent
Roessel et al.

(10) Patent No.: US 12,126,813 B2
(45) Date of Patent: Oct. 22, 2024

(54) CHANNEL-AWARE SEMANTIC CODING

(71) Applicant: Apple Inc., Cupertino, CA (US)

(72) Inventors: Sabine Roessel, Munich (DE);
Christian Drewes, Germering (DE);
Matthias Sauer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 92 days.

(21) Appl. No.: 17/949,614

(22) Filed: Sep. 21, 2022

(65) Prior Publication Data

US 2023/0094234 A1 Mar. 30, 2023

Related U.S. Application Data

(60) Provisional application No. 63/248,388, filed on Sep. 24, 2021.

(51) Int. Cl.
*H04N 19/154* (2014.01)
*G06V 20/40* (2022.01)

(52) U.S. Cl.
CPC .......... *H04N 19/154* (2014.11); *G06V 20/41* (2022.01); *G06V 20/46* (2022.01)

(58) Field of Classification Search
CPC .. H04N 19/154; H04N 19/132; H04N 19/172; H04N 19/20; H04N 19/46; G06V 20/41; G06V 20/46; H04L 65/80; H04L 1/0009; H04L 1/0014; H04L 1/0015
USPC ........................................ 375/240.16, 240.25
See application file for complete search history.

(56) References Cited

U.S. PATENT DOCUMENTS

| | | | | |
|---|---|---|---|---|
| 6,901,366 | B1* | 5/2005 | Kuhn | G06F 16/3334 704/E15.044 |
| 7,219,364 | B2* | 5/2007 | Bolle | H04N 19/20 375/E7.076 |
| 8,345,743 | B2* | 1/2013 | Shi | H04N 19/61 375/240.02 |
| 10,839,589 | B2* | 11/2020 | Cilingir | G06T 9/001 |
| 11,240,284 | B1* | 2/2022 | Gonzalez | H04L 65/75 |
| 2005/0053141 | A1* | 3/2005 | Holcomb | H04N 19/196 375/E7.138 |
| 2011/0004863 | A1* | 1/2011 | Feblowitz | G08G 1/04 706/46 |
| 2014/0077967 | A1* | 3/2014 | Alvarez Osuna | A61B 5/0022 340/870.01 |
| 2018/0253622 | A1* | 9/2018 | Chen | G06N 3/08 |
| 2020/0327334 | A1* | 10/2020 | Goren | G06V 10/454 |
| 2022/0256175 | A1* | 8/2022 | Jain | H04N 19/136 |

(Continued)

OTHER PUBLICATIONS

[No Author Listed], "Information technology—JPEG 2000 image coding system: Core coding system," International Telecommunication Union, Nov. 2015, 231 pages.

(Continued)

*Primary Examiner* — Emmanuel Bayard
(74) *Attorney, Agent, or Firm* — Fish & Richardson P.C.

(57) ABSTRACT

A method for channel aware semantic coding (CASC) by a user equipment (UE), comprising: determining a quality level for a channel for a time period in which a video frame is being transmitted over the channel; determine, based on the quality level, one or more semantic elements to include in a semantic transcript stream (STS); encode the video frame with the one or more elements of the STS; and transmit the STS to a remote device.

20 Claims, 9 Drawing Sheets

(56) References Cited

U.S. PATENT DOCUMENTS

2022/0391693 A1* 12/2022 Orhon .................... G06N 3/08
2024/0121453 A1 4/2024 Roessel et al.

OTHER PUBLICATIONS

Duan et al., "Video Coding for Machines: A Paradigm of Collaborative Compression and Intelligent Analytics," CoRR, Submitted on Jan. 13, 2020, arXiv:2001.03569, 15 pages.
Jankowski et al., "Wireless Image Retrieval at the Edge," CoRR, Submitted on Jul. 15, 2021, arXiv:2007.10915, 12 pages.
Li et al., "A Novel Hierarchical QAM-Based Unequal Error Protection Scheme for H.264/AVC Video over Frequency-Selective Fading Channels," IEEE Transactions on Consumer Electronics, Nov. 2010, 56(4):2741-2746.

\* cited by examiner

CHANNEL-AWARE SEMANTIC CODING

CLAIM OF PRIORITY

This application claims priority under 35 USC § 119(e) to U.S. Patent Application Ser. No. 63/248,388, filed on Sep. 24, 2021, the entire contents of which are hereby incorporated by reference.

TECHNICAL FIELD

This disclosure relates generally to wireless communications.

BACKGROUND

Existing and new services will move into new device categories and will expand from local to un-tethered cellular usage. However, cellular connectivity comes with inevitable challenges including bad coverage, low throughput, and highly dynamic network load and varying scheduling latencies.

SUMMARY

This application describes data processing systems and processes for channel-aware semantic coding (CASC) for media streams that include interacting semantic source coding and channel coding phases. A semantic transcript stream provides a story for the media stream and is responsive or adaptive to channel conditions.

The abstraction level of the semantic transcript allows for a significant increase of compression gains over existing media codecs enabling the targeted high-fidelity service over an impaired link. A single encoding instance supports varying authorizations and assets (e.g., multi-faceted encoding) on the receivers' end. The semantic coding and channel coding phases together result in a capability to adapt to channel conditions.

The channel-aware semantic coding (CASC) is configured to extend high-fidelity service range for cellular devices such that there is a high-fidelity quality of experience when transmitting high-fidelity content across an impaired communication link.

The disclosed techniques are realized by one or more implementations, which include the following as described in the examples section below.

The details of one or more implementations are set forth in the accompanying drawings and the description below. The techniques described here can be implemented by one or more wireless communication systems, components of a wireless communication system (e.g., a station, an access point, a user equipment, a base station, etc.), or other systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

This application describes data processing systems and processes for channel-aware semantic coding (CASC) for media streams that include interacting semantic source coding and channel coding phases. A semantic transcript stream provides a story for the media stream and is responsive or adaptive to channel conditions.

The abstraction level of the semantic transcript allows for a significant increase of compression gains over existing media codecs enabling the targeted high-fidelity service over an impaired link. A single encoding instance supports varying authorizations and assets (e.g., multi-faceted encoding) on the receivers' end. The semantic coding and channel coding phases together result in a capability to adapt to channel conditions.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Figure 1:
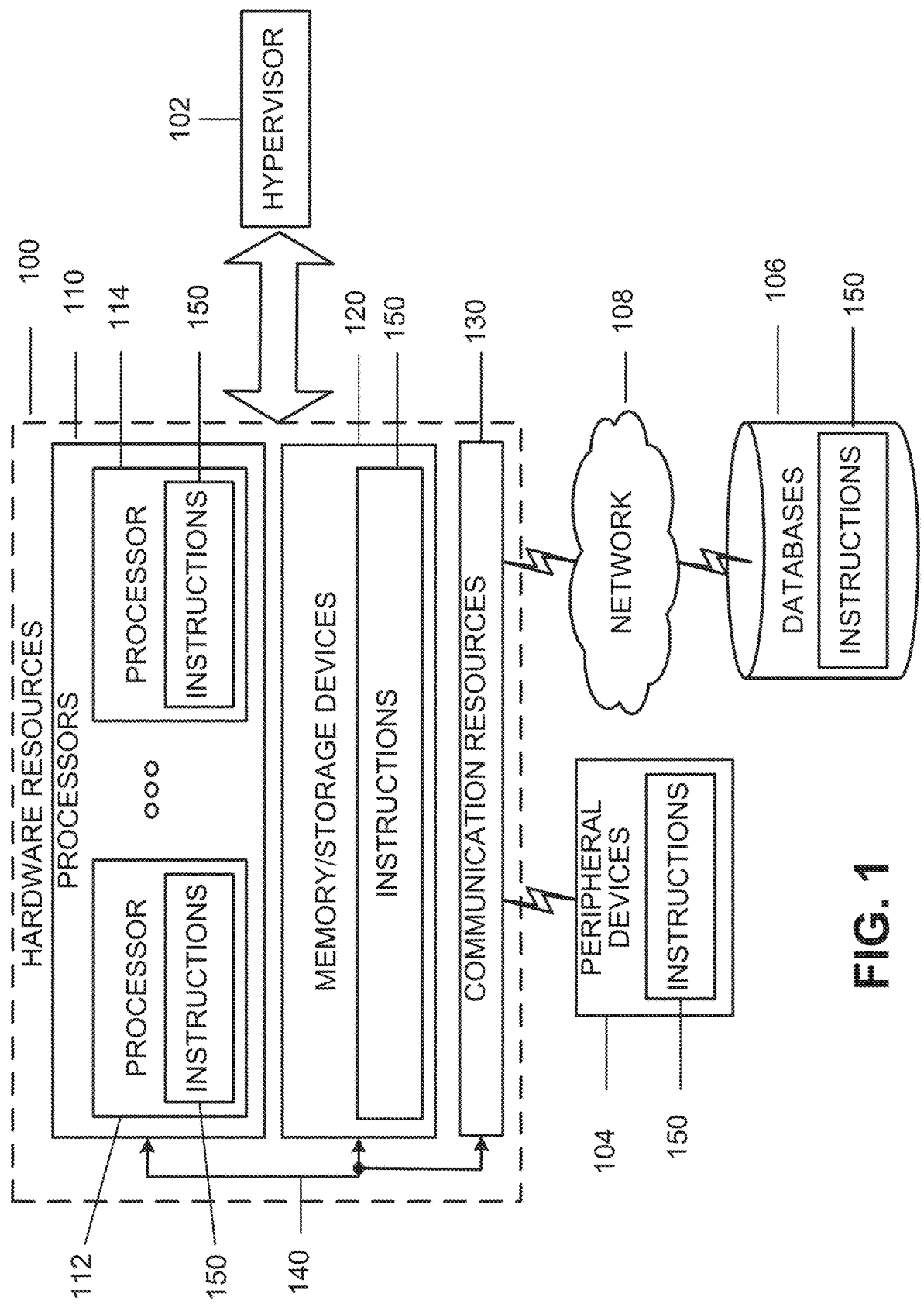
FIG. 1 illustrates an example wireless communication system, according to various implementations herein.

FIG. 1 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 1 shows a diagrammatic representation of hardware resources 100 including one or more processors (or processor cores) 110, one or more memory/storage devices 120, and one or more communication resources 130, each of which may be communicatively coupled via a bus 140. For embodiments where node virtualization (e.g., NFV) is utilized, a hypervisor 102 may be executed to provide an execution environment for one or more network slices/sub-slices to utilize the hardware resources 100.

The processors 110 may include, for example, a processor 112 and a processor 114. The processor(s) 110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 120 may include main memory, disk storage, or any suitable combination thereof. The memory/storage devices 120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 130 may include interconnection or network interface components or other suitable devices to communicate with one or more peripheral devices 104 or one or more databases 106 via a network 108. For example, the communication resources 130 may include wired communication components (e.g., for coupling via USB), cellular communication components, NFC components, Bluetooth® (or Bluetooth® Low Energy) components, Wi-Fi® components, and other communication components.

Instructions 150 may comprise software, a program, an application, an applet, an app, or other executable code for causing at least any of the processors 110 to perform any one or more of the methodologies discussed herein. The instructions 150 may reside, completely or partially, within at least one of the processors 110 (e.g., within the processor's cache memory), the memory/storage devices 120, or any suitable combination thereof. Furthermore, any portion of the instructions 150 may be transferred to the hardware resources 100 from any combination of the peripheral devices 104 or the databases 106. Accordingly, the memory of processors 110, the memory/storage devices 120, the peripheral devices 104, and the databases 106 are examples of computer-readable and machine-readable media.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Figure 2:
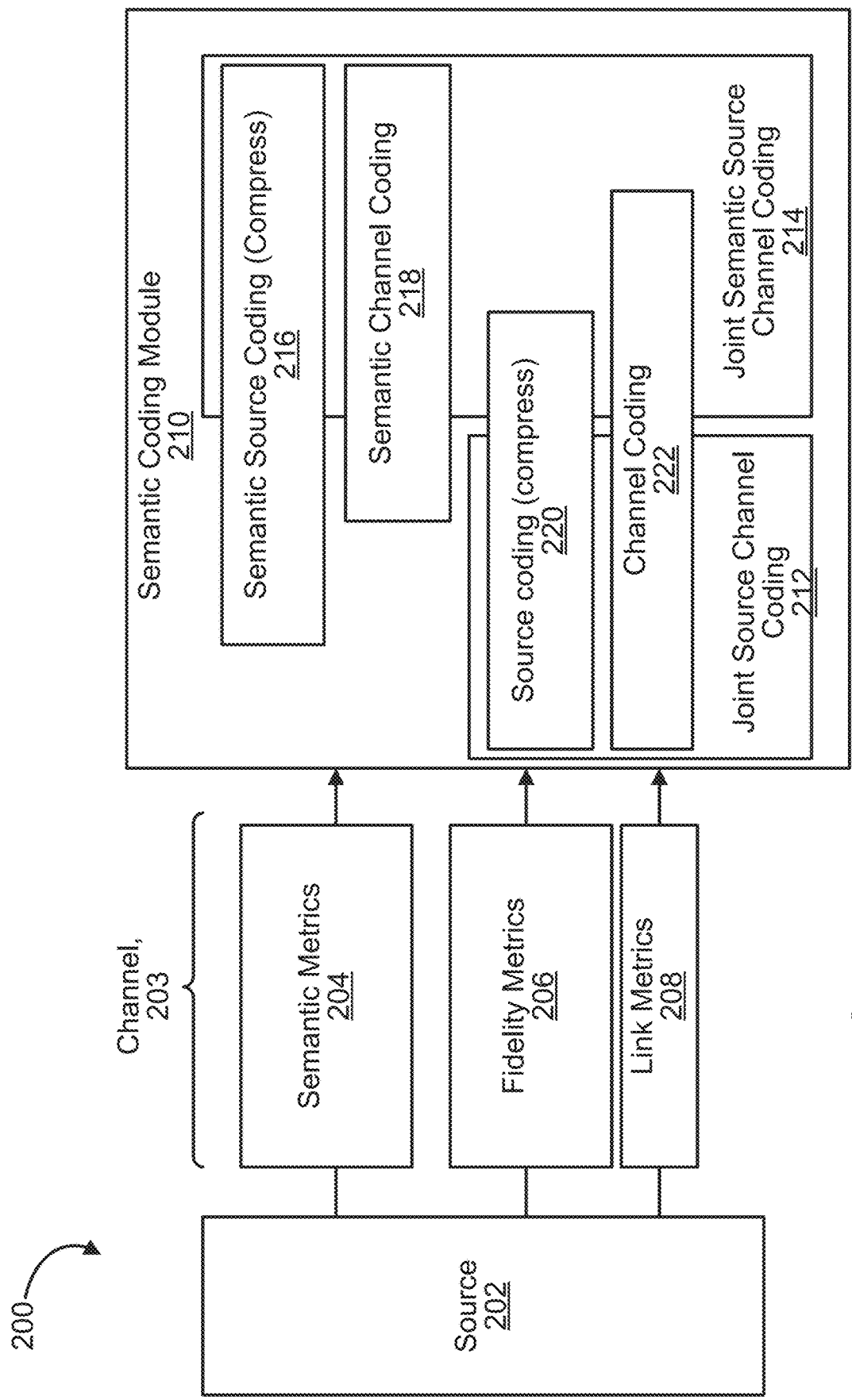
FIG. 2 illustrates an example of a semantic encoding environment.

FIG. 2 shows an example of a semantic coding reference model 200. The model 200 includes a source 202, metrics 204, 206, 208, and a semantic coding model 210. The source 202 includes the material to be semantically encoded/decoded. The source 202 material includes media such as video or images. The metrics include semantic metrics 204, fidelity metrics 206, and link metrics 208. For the reference model 200, formal informational or media source content to be sent across a wireless link is subject to semantic source coding by eliminating semantic redundancy and to semantic channel coding by adding redundancy to reduce semantic noise.

The semantic metrics 204 include correctness metrics. Correctness metrics refer to factual information represented in the source media. Correctness metrics use ontology information 204 to determine how successful the semantic encoding/decoding have been (e.g., whether transmission of the semantics has succeeded or failed). For example, if the receiver receives information indicating that a ball object is square shaped, a correctness measure may indicate that semantic encoding/decoding has an issue (e.g., a failure point).

The semantic metrics 204 include consistency metrics. The consistency metrics measure object relationships in the media, details for the depicted scene (e.g., an environment or location), spatial-temporal information for the scene, and physical or action information for the scene. For example, consistency metrics include measurements of physical relationships of objects within the scene, and whether these physical relationships are consistent with what would be expected or possible in the scene. For example, if a ball is falling, but falls to the ceiling in an image, the consistency metrics may indicate that an issue has occurred in the semantic encoding or decoding. The semantic metrics 204 include rules for rule-based encoding and decoding. These rules include measures for ethics, aesthetics, regulations, and other such rules related to personally identifiable information (PII) generated depictions of individuals in a synthetic video, and so forth.

The coding tasks performed in the model 200 include semantic source (en-)coding using module 216 on the transmit side and semantic source (de-)coding using module 216 on the receiver side. The model 200 performs semantic channel coding at module 218 and semantic channel (de-)coding at module 218 on the receiver side. The model includes classical source coding (compression/decompression) at module 220 and classical channel coding at module 222.

Semantic source coding includes extracting semantics from the source information (source "material", 202). A semantic channel refers to semantic noise measured against semantic metrics 204. The semantic channel includes measuring correctness and consistency metrics. A classical source channel include a channel for a media source that introduces source noise measured against fidelity metrics 206 like POLQA or PSNR on the decompressed media stream at the receive side. A communication link includes a physical channel that can introduce channel noise measured against link metrics 208 to the transmit signal. The receiver accommodates the noise when decoding the encoded data.

The semantic metrics 204 comprises of semantic correctness and consistency metrics related to the correct interpretation and reconstruction of media content. The fidelity metrics 206 include syntactic correctness, symbol correctness, and sound correctness. For example, syntactic correctness includes word-level correctness for objects represented in the source 202 media. For example, symbol correctness includes character correctness and sign correctness. For example, fidelity includes Perceptual Objective Listening Quality Analysis (POLQA), mean opinion scoring (MOS), and peak signal-to-noise ratio (PSNR).

The link metrics 208 include channel metrics that are associated with the data transmission of the source 202 media. For example, link metrics 208 include BLER or BER.

The semantic coding module 210 includes sub-modules for encoding or decoding the source information (source "material") 202 in relation to the metrics 204, 206, and 208. The semantic coding module 210 includes a joint source channel coding module 212 and a joint semantic source channel coding module 214. The joint semantic source channel (JSSC) coding refers to joint encoding and optimization of semantic source coding 216 and semantic channel coding 218. In some implementations, JSSC coding refers to a joint encoding and optimization of semantic source coding 216 and channel coding 222 tasks, up-to joint encoding and optimization of all four elements, including semantic source and channel coding tasks, and the classical source coding 220 and channel coding 222 tasks. Channel-Aware Semantic Coding (CASC) enhances JSSC coding to create a combined coding phase for both the source 202 and channel 203.

A semantic transcript stream (STS) represents what is occurring in a respective media stream. In an example, the STS stream includes of a stream of frames, where the frames' content is captured in a computer-readable notation. The notation can include one or more of an annotated graph, mathematical categories and operators, a formal computer language, or a formalized natural language represented as text, etc. CASC is illustrated with a formalized natural language represented as text, but not limited to such a format.

CASC includes channel-aware/adaptive extraction of semantics, generation and QoS annotation of the STS and creation of semantic source and channel coding SSCC streams. CASC includes that each SSCC stream is subject to loss-less source compression and channel coding. Following channel decoding and source decompression the SSCC, streams are re-assembled into the STS. Individual assets such as a photo-realistic model of, e.g., family members, based on privacy and access authorizations are embedded into (customized) machine learning inference engines. Machine learning inference engines synthesize video and audio from the STS in various steps.

The STS includes the following features. STS includes a story stream (configurable with an event-trigger or a frame rate [fps]). STS is a flexible, hierarchical, and structured dataset that includes a formal, computer-readable format. STS includes channel awareness. A structural depth of STS the STS data frame rate (e.g., an amount of semantic information present in the STS) are based on predicting UE's channel capacity and transmission grants for the UE, and consistently fitting the extracted STS to a UE's actual bandwidth and transmission grant(s). A quality of experience of the synthetic video depends on the channel-awareness controlled information depth of the STS. This is for a 0-quality level story semantic transcript. STS comprises of a sequence of full and delta frames. A full frame captures features, such as subjects (persons, animals, objects, . . . ) as well as action(s) detected and extracted from (a set of) classical video frame(s). (The "full frame" can be understood in analogy to the I-frame of a classical video codec.) For example, two people are detected, and that they are playing with a ball is also detected. A delta frame captures deltas to the full frame, such as: new state of elements of the semantic story, the producer's pose (6 degrees of freedom), a time stamp, etc. Each of the actors' and action stream (with a configurable frame rate [fps]) are included, such as for 1-quality level story semantic transcript. A full frame: inter-related key actors in story is included. For example, a subject's body pose, an action for the subject, and so forth. For example, the action may indicate that the actor is preparing to kick a ball, a location of where the ball is and its body pose (e.g. is it in motion, etc.). For each frame, a time stamp is provided. Each actor is associated with (an) actor inter-relation depth variable(s).

The delta frame for STS indicates changes since a prior frame. This can indicate updates for the subjects of the frame. For example, a body pose update for an actor in the frame, and action update for the actor, and so forth. For example, the STS delta frame may indicate that the actor (now) kicks the ball, an update to the ball body pose, a time stamp associated with the frame.

The STS includes details for each of the actors and actions in the stream. This is a 2-quality level story semantic transcript. For example, for the full frame the STS provides details for the actor's body, such as a leg sub-pose (or update to the leg sub pose), head sub-pose, and so forth for various parts of the actor.

The STS stream can include actors emotional state stream (e.g., as an optional 2-quality level story semantic transcript), scene stream (e.g., as an optional 1-quality level story semantic transcript), and an atmosphere stream (e.g., as an optional 2-level story semantic transcript).

The STS includes annotations and anchors for each of the subjects of the frame. For example, annotations for details of the actors, such as colors or sounds associated with the actor. The STS includes meta-frames that identify identities of subjects, producers, locations, and so forth. The meta-frames are subject to privacy controls on the receiving side.

The STS enables transmission of semantic data from the sender to the receiver. In some implementations, the sender sends no video frames or a limited number of video frames. The receiver is configured to rebuild the video from the frames received or from the semantic data alone. For instance, the receiver may have a library of objects from which to build the video.

A sender or receiver of the system is configured to determine a channel quality between the sender and receiver. The sender can send video of varying fidelity depending on the channel quality. For example, in a high throughput or stable channel, the sender sends high-fidelity video. If the channel quality is very poor, the sender sends only STS data, reducing in this example the required data to be sent by over 50× compared to conventional compressed video frames. As the channel quality changes, the channel capacity varies such that the amount of data that can be sent can vary.

For the given example the amount of data (bytes) used at each semantic coding level amounts to: For a 0-level story full-frame: 20 words w/average of 8 characters (160 byte); initial privacy and access annotation: 64 byte (typical) up-to 224 byte. For a 0-level story delta-frame: 16×2 byte producer view's 6 DoF pose (32 byte), 30 fps for 32 byte. For a 1-level and 2-level actors' and action full-frames: 8 key actors' body poses (3×2 byte spatial anchors, 48 byte) plus 12 key actor sub-poses (3×2 byte spatial anchors, 72 byte); subset of actors' activities w/20 semantic items with 4×8 byte contextual information (640 byte), 15 fps for 952 byte. For 1-level and 2-level actors' and action delta-frames: assume 10% of full-frame, 15 fps for 96 byte. Assuming a loss-less compression rate of 70% and 1 out of 8 frames for the "Escape mode" cell edge, i.e., generally bad radio link conditions for all levels' full frames a robust MCS 1 (code rate=0.05–QoS-Flow 1) and for all levels' delta frames MCS 3 (code rate=0.2–QoS-Flow 2) and 8 byte L2+RoHC overheads results in a ~57 kbps data rate requirement. However, it is possible to achieve a sub-15 kilobytes per second (kbps) data rate.

For a 4K resolution at 30 fps source video having a of raw bit stream of ~3.7 Gbps we assume a best-case compressed to ~2.5 Mbps, and for which we use a higher MCS scheme (code rate 0.5 there is an approximately 50× compression gain over the recent classical MPEG/VCEG video codec while high-fidelity QoE can be established due to semantic synthesis tools on the receiver side.

In an example, the semantic transcript stream (STS) includes a story stream, an actors and actions stream, a details stream (e.g., for each actor or action), a scene stream, and an atmosphere stream. The story stream includes annotations, anchors, and metadata (e.g., privacy and authentication information) for the story. The actors an actions stream includes annotations, anchors, and metadata for each actor and/or action, including further details which can be associated with the particular actor or action in a nested format. Each actor or action anchor is associated with data such as 6 DoF data, time stamp data, and so forth. Each actor or action metadata can include privacy information or protected asset access data, which can restrict access to a given asset for video reconstruction. Each scene stream is associated with annotations, anchors, and metadata for that scene. Atmosphere streams can be nested for each scene stream, including its own annotations, anchors, and metadata.

Figure 3A:
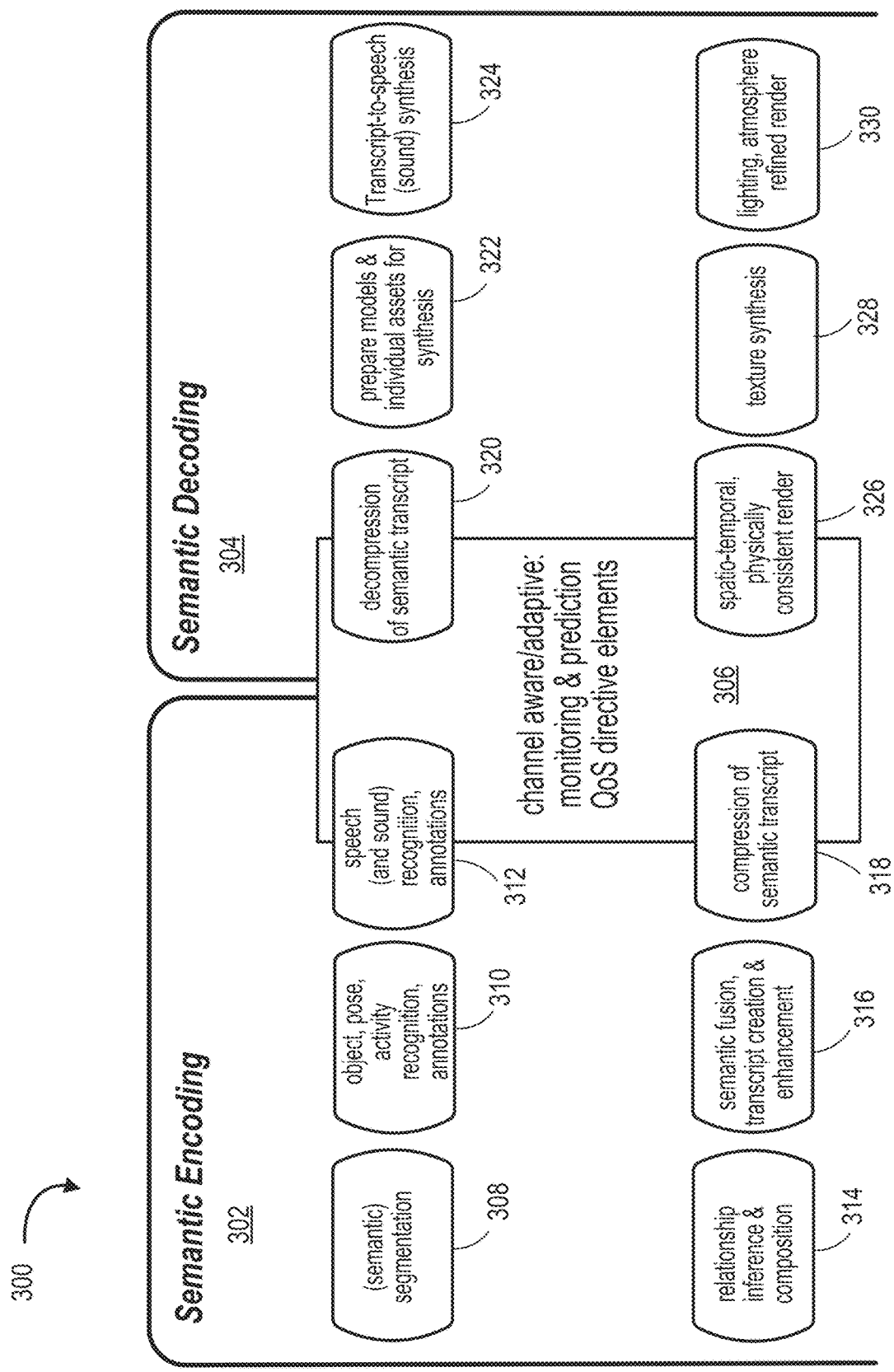
FIG. 3A shows an example of a channel aware semantic encoding environment.

FIG. 3A shows the framework 300 for channel-aware semantic coding. CASC includes selecting an amount of data to send (e.g., STS stream and video, video only, STS stream only, amount and frequency of optional sub-streams or actors captured, etc.) based on the quality of the channel that is experienced by the sender or receiver (as previously described). The STS includes semantic segmentation, object pose and activity recognition, speech and sound recognition, relationship inference and composition, semantic fusion and transcript composition, and compression of the semantic transcript, as subsequently described. As previously described, a level of the STS provided depends on the QoS measurements by the sender or receiver. The receiver is configured to perform decompression of the semantic transcript, prepare models and individual assets for synthesis, perform transcript to sound synthesis, perform spatial-temporal, physically consistent renders, perform texture synthesis, and render lighting or atmosphere, as subsequently described.

In FIG. 3A, the CASC environment includes a semantic encoding workflow 302 and a semantic decoding workflow 304, in addition to channel-aware/adaptive monitoring and prediction for effects from the channel 306. For the semantic encoding workflow 302, a data processing system performs semantic segmentation 308, generates video annotations 310, performs audio annotations 312, determines relationship inferences and compositions 314 for objects in the media, performs semantic fusion 316, and performs compression 318 of the semantic transcript. FIGS. 3B-3E illustrate the details of the semantic encoding and semantic decoding functions.

Semantic segmentation 308 includes dividing, by a data processing system, an image frame (for example) into portions. The portions can include known portions of a scene, such as the ground and the sky. In some implementations, the segmentation can include selection of foreground and background. Other segmentation is possible.

Figure 3B:
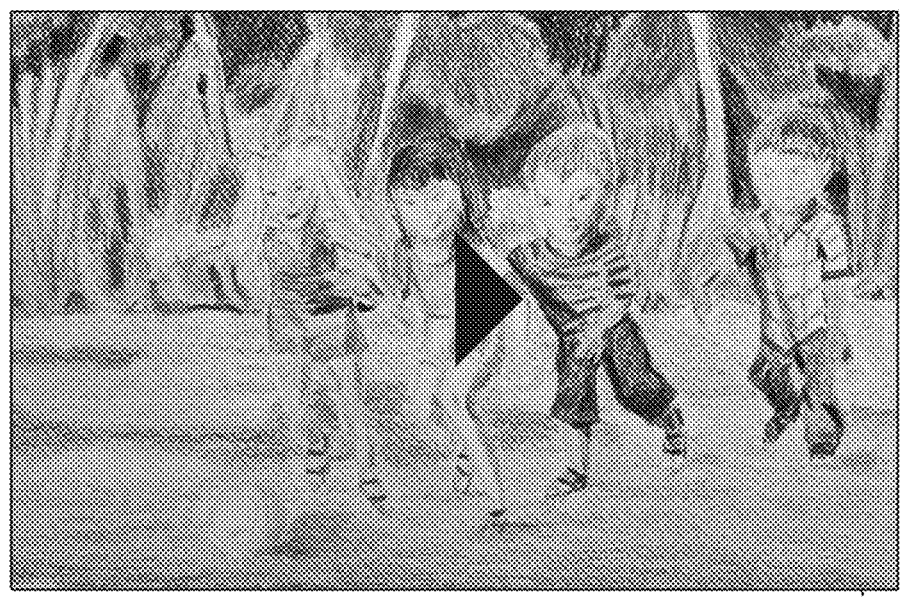
FIG. 3B shows an example of a channel aware semantic encoding environment.
Figure 3B:
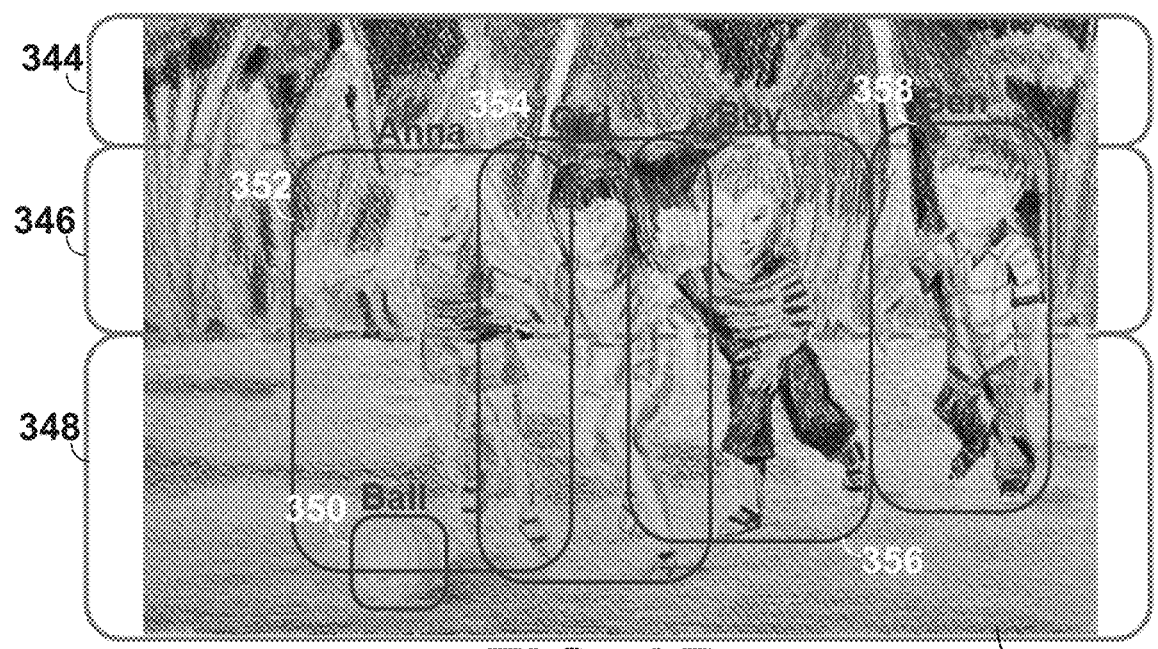

As shown in FIG. 3B, a video frame 342 is extracted from source media. The frame 340. The frame 342 is segmented into segments 344, 346, and 348. Here, the segment 344 includes background level material. Segment 346 includes a nearer layer, such as one in front of a distant background but not in a foreground. The segment 348 includes a closest layer, such as a ground surface.

Returning to FIG. 3A, the data processing system in environment 300 performs object recognition 310. Object recognition includes extracting objects. Objects include anything that may be of interest in the media, such as unique things, things in a foreground, or any other subject of the media. Objects can include people, animals, inanimate objects, and so forth. Generally, for a video, objects are recognizable things within the media, and are generally what are in focus in image frames. Object poses include identifying a position and orientation of an object that is recognized within the image frame. Pose recognition may include translation and/or rotation of objects that are extracted. If the object is extracted, additional data is used to generate a representation of other poses of the object within the frame.

For example, in FIG. 3B, the data processing system identifies a ball object 350, an object Anna 352, an object girl 354, an object boy 356, and an object Ben 358. Ball 350 is an inanimate object. Boy 356 and girl 354 are objects, but they are generic objects. Anna 352 and Ben 358 are unique objects.

Activity recognition includes determining, by the data processing system, what the objects in the frame are doing. Annotations, other objects, the scene, and other information can provide context to actions being performed by objects within an image frame. Annotations are provided by the data processing system to describe the objects, their poses, and their activities.

The data processing system performs audio analysis 312. The audio processing includes speech and sound recognition, and generating annotations to describe these sounds. In some implementations, speech and sound recognition includes identifying a source of the sound, such as a particular person, a type of animal, a type of vehicle, and so forth. Machine learning models can be used to extract and annotate sounds.

Figure 3C:
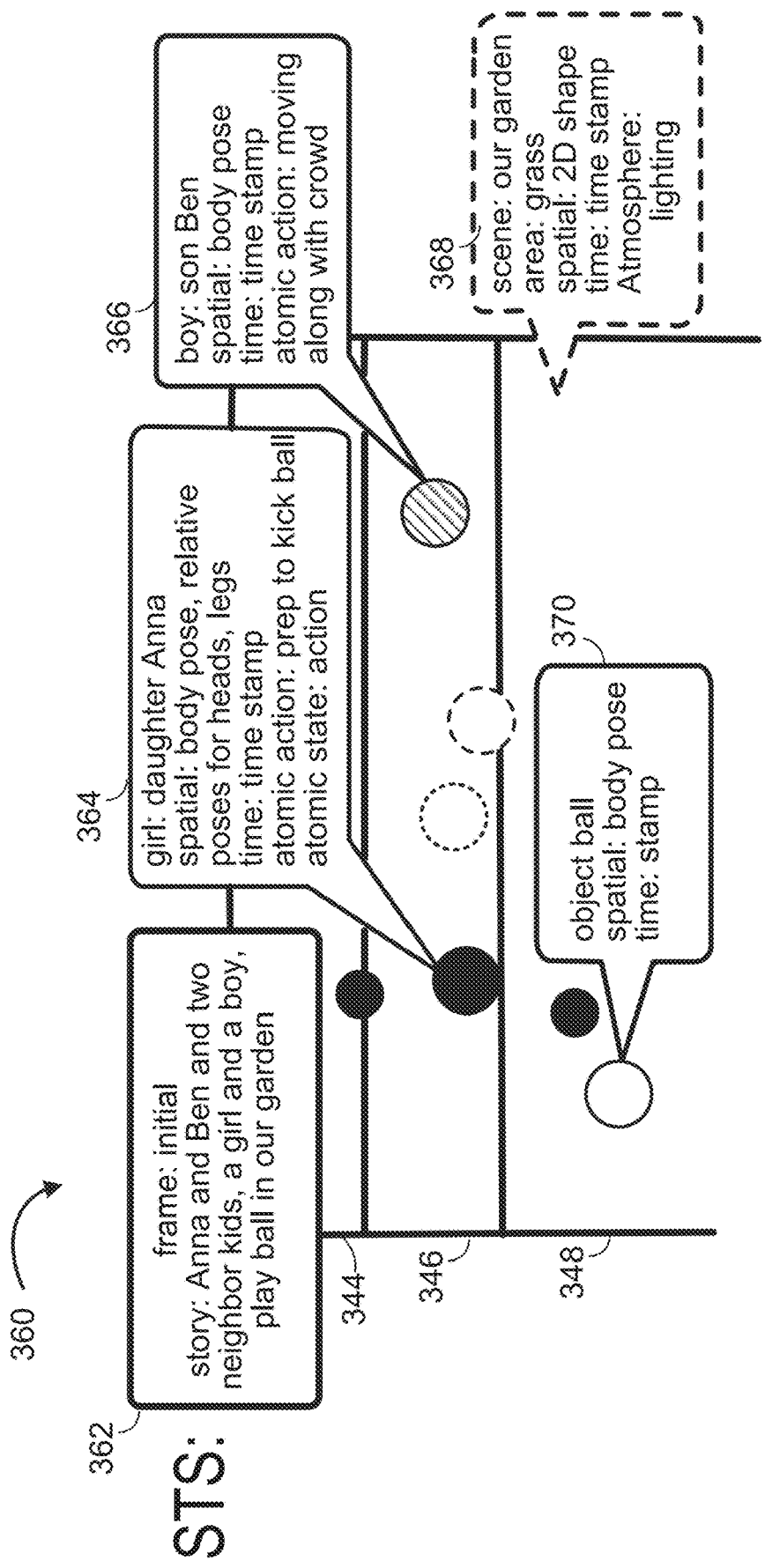
FIG. 3C shows an example of a channel aware semantic encoding environment.

The data processing system is configured to perform relationship inferences and compositions 314. Relationship inferences include generating relationships between and among objects within the image frame. The objects may be interacting, about to interact, or may have recently interacted. For example, as shown in FIG. 3C, in describing the image frame 342, the data processing system generates overall annotations 362 describing the scene and relationships between the objects such as Anna, 352, Ben 358, the boy 356, and the girl 354. They are related to the ball 350. Anna 352 is annotated by annotations 364 indicating her poses for her head, legs, and body, her state of movement (static action), a time stamp, and so forth. Anna 352 is related to the ball 350 using the diagram 360. The ball 350 is annotated with annotations 370. Ben 358 is annotated with annotations 366. The scene is annotated with annotations 368 describing the location, area, spatial data, and atmosphere.

Figure 3D:
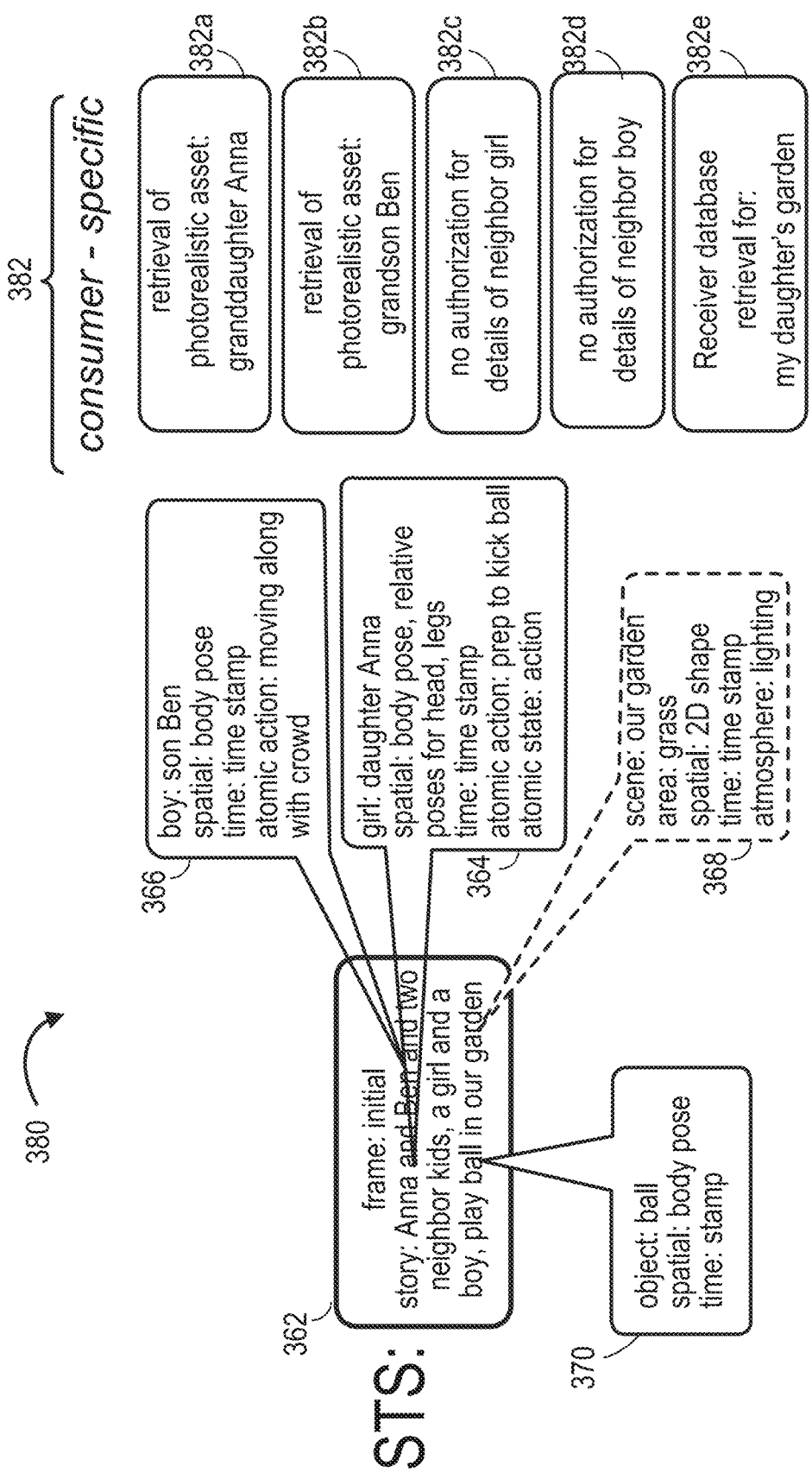
FIG. 3D shows an example of a channel aware semantic encoding environment.

The data processing system performs semantic fusion 316. Sematic fusion 316 includes generating a transcript 380 for all the semantic data to be encoded and transmitted to another device. The semantic fusion 316 includes ordering the annotations 362, 364, 366, 368, and 370, as shown in FIG. 3D. The semantic fusion 316 includes determining consumer-specific rules 382 for transmitting data, annotating data, generating synthetic or enhanced data, and so forth. For example, the consumer is authorized to receive details regarding the girl Anna and the boy Ben, as shown by rules 382a and 382b. Rules 382c-d indicate that there is no authorization for semantic details to be retrieved for the objects boy and girl. The semantic details for the scene are retrievable, as shown by rule 382e.

Returning to FIG. 3A, semantic encoding 302 includes compressing the semantic transcript 380 and sending the transcript over a channel 306. The semantic decoding process 304 performs channel monitoring and performs predictions of QoS directive elements, as subsequently described.

The semantic decoding 304 process includes decompression of the semantic transcript 320, preparation 322 of models and individual assets for synthesis transcript-to-speech synthesis 324, spatial-temporal rendering 326, texture synthesis 328, and lighting rendering 330. The data processing system is configured to decompress the transcript and extract annotations for each object, the scene, audio data, and relationships data. The data processing system generates synthetic frames for the video. The purpose of this is to generate video when only portions of the video are received. For example, the receiver can decode a video frame and generate one or more additional frames from the received frame by adding new objects, translating and/or rotating existing objects, adding new audio, and so forth. The data processing system can therefore improve a video quality over conventional compression approaches.

The quality of service (QoS) metric is measured by one or both of the sender and receiver. The sender can send various amounts of data depending on the QoS. The decision for what data to send is based on the following aspects.

The CASC depends on a monitoring and prediction component. The sending device is configured to monitor events such as call drops, tracking frequency and size of upload (UL) grants, tracking measurements for handovers, reference symbols, and so forth. The device predicts a future achievable UL data rate (or the related UL grant profile in case of 5G NR).

The CASC depends on a steering quality and depth of STS. Steering the quality and depth of semantic extraction to generate the STS is based on the predictions of channel quality as described previously. This includes but is not limited to, e.g., (1) dynamic inclusion or skipping of 1-level or 2-level streams (e.g. the skipping the 2-level actors' and action details stream), (2) steering the size of the key actor set, (3) controlling the amount of annotations for photo- and phono-realistic enhancements, and so forth.

The CASC includes linking the QoS determination to STS elements of the STS. The STS element, such as stream type, stream level, full frame, delta frame, meta-frame, annotations, and anchors, are generated and transmitted depending on the QoS. The elements of STS are linked to QoS based on the QoS prediction. For example, QoS directives correspond to multiple, e.g. 8, 16, or more, levels of robustness demand, or forward error correction (FEC) demand, or modulation and coding scheme (MCS) demand.

CASC includes assigning (e.g., aggregating) STS elements to semantic source coding and channel coding (SSCC) streams. Generally, STS elements are assigned to SSCC streams based on the actual channel status. There is an n-to-m QoS directives-to-SSCC streams mapping (where n>=m). If the actual status cannot be satisfied with the mapping because some QoS directives are not properly mapped, STS elements are automatically dropped based on respective priority values associated with each of the STS elements.

Figure 3E:
FIG. 3E shows an example of a channel aware semantic encoding environment.
Figure 3E:
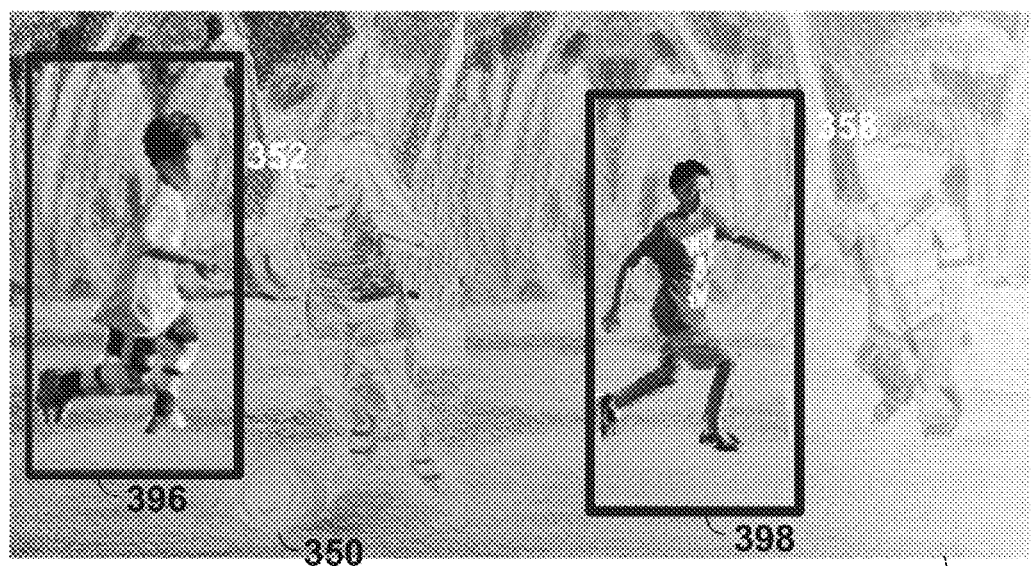

As shown in FIG. 3E, the data processing system generates a synthetic video frame for a decoded video 390. The data processing system segments frame 342 to generate a segmented frame 392. The data processing system then generates new synthetic objects 396, 398 to add to the original frame along with existing objects Anna 352 and Ben 358. The objects boy 356 and girl 354 are removed. The object ball 350 remains. Frame 394 is therefore an entirely new frame that was not received from the source 202. Objects 396, 398 can be synthetic objects or from a library of existing objects. The added objects can include schematic or textual or arbitrary avatar-alike photorealistic or cartoon substitutes.

Figure 4:
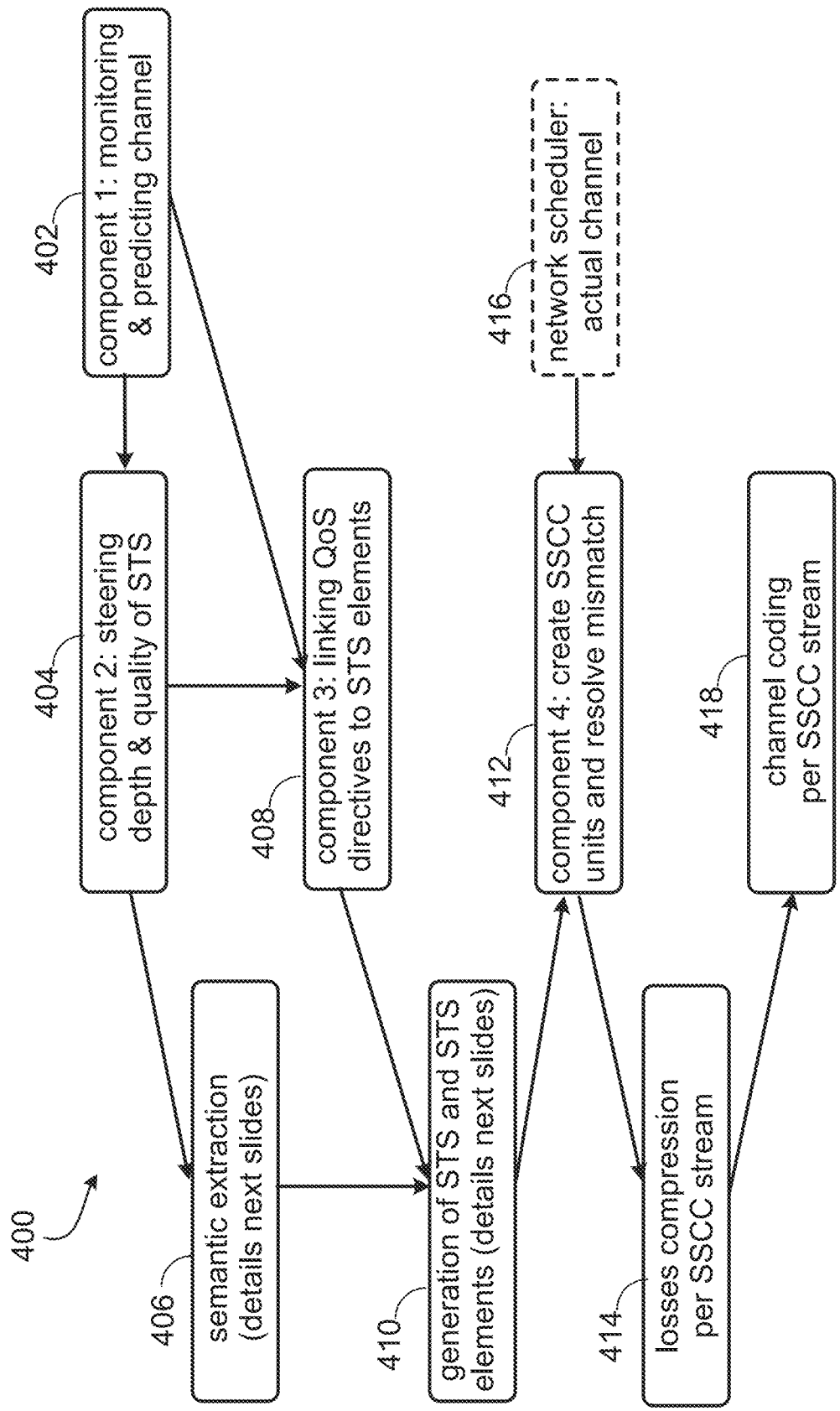
FIG. 4 shows an example process for CASC.

FIG. 4 shows an example process 400 for CASC. In some implementations, process 400 is performed by data processing system 100 described in relation to FIG. 1. At step 402, the channel is monitored. The device generates a prediction of what channel quality will be for the next transmission. At step 404, the device determines, based on the predicted channel quality, what depth of STS to transmit and what quality of video to transmit. At step 406, the device performs semantic extraction as described herein. The features form the building blocks for the STS that is to be generated. At step 408, the device indicates which STS elements to transmit or not based on the QoS that is predicted or determined. At step 410, the device generates the STS based on the STS elements marked for being transmitted. At step 412, the device generates the SSCC stream. The network scheduler sends 416 data representing the actual channel state. If there is a mismatch between the predicted and actual channel, the device resolves the mismatch by dropping STS elements (e.g., if channel quality is unexpectedly poor) or adds video frames (e.g., if the channel quality is unexpectedly robust). At step 414, the device generates the SSCC stream for transmitting to the receiving device. At step 418, the device transmits the STS stream over the channel based on the generate SSCC stream.

In some implementations, the process includes a routine that extracts the semantic transcript for the producer's facial, lips, eye, hand, and body expressions. The semantic transcript is an enhancement over the existing face camera-to-animation and XR pose extraction because the STS uses words and grammar (rather than commands) available in a (formal) language (rather than a codebook). The process extracts the semantic transcript for the producer's live video by extracting semantic items such as persons, objects, sites/scenery, events, actions, interactions and relations between semantic items.

In some implementations, the process includes extracting the semantic transcript of the producer's creation of or exposure to audio, such as voice and sound.

In some implementations, STS includes a routine that synthesizes from the semantic transcript or obtains from decoding multiple quality level semantically enhanced video and audio compressed frames photo-realistic and phono-realistic dynamic persona as well as scenery.

In some implementations, for privacy protection, the receiving device side receives end-to-end encrypted data independently of whether these are semantic transcripts, semantically boosted compressed frames, or regularly compressed frames.

In some implementations, for the synthesis of photo- and phono-realistic personae or private scenery/sites, the receiver receives, either during the call or upfront, permission to use person or private scenery/site assets queried from the JSSCC_v1CASC's local HW enclave.

In some implementations, a synthesis routine creates a synthetic video from the semantic transcript stream wherein the spatial-temporal and physical consistency extends to the level of contextual/annotations information in the semantic transcript stream.

In some implementations, the synthetic facial, lips, eye, hand, and body expressions stream representing the recreated producer side are optimized based on the sync markers anchors in the semantic transcript with respect to the producer side audio as well as with respect to the producer's reactions to the consumer audio and visual inputs. Optimization means that eventually, emotions, visual and audio expressions or scenery from the producer side is dropped at the consumer side to avoid ambiguity. Markers Annotations for heard audio in the semantic transcript are used to potentially drop producer's facial, lips, eye, hand, and body expressions related to heard audio, such as when conversational end-to-end latency exceeds 100 milliseconds or if the compute performance of the receiving device is insufficient.

In some implementations, the synthesis routine takes the semantic transcript stream into a well-trained Generative Adversarial Network (GAN) or an alternative machine learning based tool that creates a synthetic video with potentially initially arbitrary or default (grey scale) phototextures.

In some implementations, individual and photorealistic person (facial) models and private scenery/site models from the HW enclave the synthesis routine in the 2nd step adds individual and photorealistic details and texture where the consuming device has permission to use these models.

In some implementations, a routine synthesizes the producer-side voice(s) from the audio markers annotations and/or audio embeddings added to the semantic transcript. In some implementations, a routine synthesizes the producer-side emotional elements in the voice from the audio markers annotations and/or audio embeddings added to the semantic transcript.

In some implementations, for semantic coding of a voice (call), automatic speech recognition systems and or text to speech synthesis are used without linguistic knowledge. In some implementations, a routine synthesizes from the producer-originating sound annotations and/or sound embeddings added to the semantic transcript. In some implementations, the system generates individual sound or sound with musical elements from text.

Figure 5:
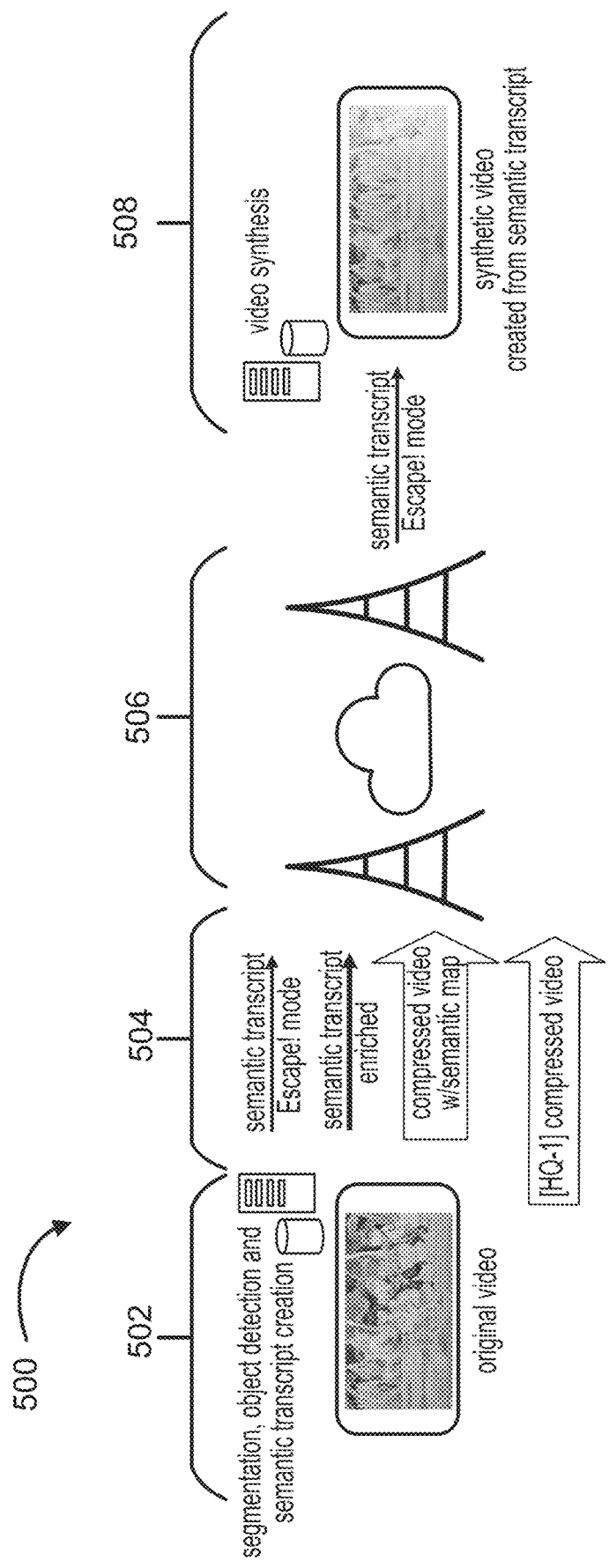
FIG. 5 shows a system for CASC.

FIG. 5 shows an example environment 500 for CASC. The environment 500 includes a sending device 502, a receiving device 508, a channel 506, and a plurality of transmission levels 504. The sending device 502 determines a QoS for the channel, as previously described. Based on the determined QoS, a transmission level 504 is selected. For example, for a low quality channel, the transmission level can include a basic STS mode. In this example, no video is transmitted. The video is completely rebuilt by the receiving device based on the elements of the STS. In some implementations, stock images, sounds, backgrounds, etc. can be selected from a library at the receiver to rebuild a video at the lowest transmission level. The levels 504 can include an STS-enriched transmission mode including more features than the basic STS elements of the lowest mode. A richer video can be built by the receiving device. The levels 504 can include a compressed video and STS mode. In this mode, portions of the compressed video are rebuilt by the receiving device. For example, backgrounds can be stock images or static images rebuilt from a library, but primary objects (e.g., a running person and a ball being kicked) or portions thereof can be received from the video frames. For example, a subject's face may be received from the video, but parts of the subject's body or clothing can be built by the receiver. In a high quality mode of levels 504, the sender sends full compressed video.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

EXAMPLES

In the following sections, further exemplary embodiments are provided.

Example 1 includes a method for channel aware semantic coding (CASC) by a user equipment (UE), comprising: determining a quality level for a channel for a time period in which a video frame is being transmitted over the channel; determining, based on the quality level, one or more semantic elements to include in a semantic transcript stream (STS); encoding the video frame with the one or more elements of the STS; and transmitting the encoded video frame to a remote device.

Example 2 including the method of example 1 or some other example herein, wherein determining the quality level comprises: monitoring channel features comprising one or more of a size of upload grants, a measurement for a handover, or a reference symbol; and generating a prediction of an upload data rate for transmitting the video frame.

Example 3 including the method of examples 1-2 or some other example herein, wherein determining one or more semantic elements to include comprises determining a number of annotations for extracting from the video frame.

Example 4 including the method of examples 1-3 or some other example herein, wherein determining one or more semantic elements to include comprises determining an amount of bandwidth available for semantic elements; assigning each semantic element a priority; and including higher priority semantic elements until the amount of bandwidth available is exhausted.

Example 5 including the method of examples 1-4 or some other example herein, further comprising: assigning a privacy marker to the one or more semantic elements, the privacy marker requiring the remote device to have a corresponding permission to access the semantic element.

Example 6 including the method of example 5 or some other example herein, wherein the semantic element comprises an identifier of a person or object.

Example 7 including the method of example 5 or some other example herein, further comprising performing end-to-end encryption of the one or more semantic elements associated with the privacy marker.

Example 8 including the method of examples 1-7 or some other example herein, wherein the determined channel quality level is a predicted channel quality level, the method further comprising: receiving an actual channel quality level at the time of transmitting the encoded video frame; determining that the actual channel quality level has a reduced quality relative to the predicted channel quality level; removing one or more semantic elements from the encoded video frame, based on one or more priority rules or by changing one or more of the configurable frame rates for semantic elements; and transmitting the encoded video frame without the removed one or more semantic elements.

Example 9 including the method of examples 1-8 or some other example herein, wherein transmitting the encoded video frame comprises transmitting the STS data only without video frame data.

Example 10 including the method of examples 1-9 or some other example herein, wherein transmitting the encoded video frame comprises transmitting the STS data with a full compressed video frame or by attaching one or more portions of the video frame.

Example 11 including a user equipment (UE) configured for channel aware semantic coding (CASC), comprising: at least one processor; and a memory storing instructions that, when executed by the at least one processor, cause the at least one processor to perform operations comprising: determining a quality level for a channel for a time period in which a video frame is being transmitted over the channel; determining, based on the quality level, one or more semantic elements to include in a semantic transcript stream (STS); encoding the video frame with the one or more elements of the STS; and transmitting the encoded video frame to a remote device.

Example 12 including the UE of example 11 or some other example herein, wherein determining the quality level comprises: monitoring channel features comprising one or more of a size of upload grants, a measurement for a handover, or a reference symbol; and generating a prediction of an upload data rate for transmitting the video frame.

Example 13 including the UE of examples 11-12 or some other example herein, wherein determining one or more semantic elements to include comprises determining a number of annotations for extracting from the video frame.

Example 14 including the UE of examples 11-13 or some other example herein, wherein determining one or more semantic elements to include comprises determining an amount of bandwidth available for semantic elements; assigning each semantic element a priority; and including higher priority semantic elements until the amount of bandwidth available is exhausted.

Example 15 including the UE of examples 11-14 or some other example herein, the operations further comprising: assigning a privacy marker to the one or more semantic elements, the privacy marker requiring the remote device to have a corresponding permission to access the semantic element.

Example 16 including the UE of example 15 or some other example herein, wherein the semantic element comprises an identifier of a person or object.

Example 17 including the UE of example 15 or some other example herein, further comprising performing end-to-end encryption of the one or more semantic elements associated with the privacy marker.

Example 18 including the UE of example 15 or some other example herein, wherein the determined channel quality level is a predicted channel quality level, the method further comprising: receiving an actual channel quality level at the time of transmitting the encoded video frame; determining that the actual channel quality level has a reduced quality relative to the predicted channel quality level; removing one or more semantic elements from the encoded video frame, based on one or more priority rules or by changing one or more of the configurable frame rates for semantic elements; and transmitting the encoded video frame without the removed one or more semantic elements.

Example 19 including the UE of examples 11-18 or some other example herein, wherein transmitting the encoded video frame comprises transmitting the STS data only without video frame data.

Example 20 including the UE of examples 11-19 or some other example herein, wherein transmitting the encoded video frame comprises transmitting the STS data with a full compressed video frame or by attaching one or more portions of the video frame.

Example 21 may include a signal as described in or related to any of examples 1-20, or portions or parts thereof.

Example 22 includes a datagram, information element, packet, frame, segment, PDU, or message as described in or related to any of examples 1-21, or portions or parts thereof, or otherwise described in the present disclosure.

Example 23 may include a signal encoded with data as described in or related to any of examples 1-22, or portions or parts thereof, or otherwise described in the present disclosure.

Example 24 may include a signal encoded with a datagram, IE, packet, frame, segment, PDU, or message as described in or related to any of examples 1-23, or portions or parts thereof, or otherwise described in the present disclosure.

Example 25 may include an electromagnetic signal carrying computer-readable instructions, wherein execution of the computer-readable instructions by one or more processors is to cause the one or more processors to perform the method, techniques, or process as described in or related to any of examples 1-24, or portions thereof.

Example 26 may include a computer program comprising instructions, wherein execution of the program by a processing element is to cause the processing element to carry out the method, techniques, or process as described in or related to any of examples 1-25, or portions thereof.

Example 27 may include a signal in a wireless network as shown and described herein.

Example 28 may include a method of communicating in a wireless network as shown and described herein.

Example 29 may include a system for providing wireless communication as shown and described herein.

Example 30 may include a device for providing wireless communication as shown and described herein.

What is claimed is:

1. A method performed by one or more processors, the method comprising:
   determining a quality level for a channel for a time period in which a video frame is being transmitted over the channel;
   determining, based on the quality level, one or more semantic elements to include in a semantic transcript stream (STS);
   encoding the video frame with the one or more semantic elements of the STS; and
   preparing the encoded video frame for transmission to a remote device.

2. The method of claim 1, wherein determining the quality level comprises:
   monitoring channel features comprising one or more of a size of upload grants, a measurement for a handover, or a reference symbol; and
   generating a prediction of an upload data rate for transmitting the video frame.

3. The method of claim 1, wherein determining one or more semantic elements to include comprises determining a number of annotations for extracting from the video frame.

4. The method of claim 1, wherein determining one or more semantic elements to include comprises determining an amount of bandwidth available for semantic elements;
   assigning each semantic element a priority; and
   including higher priority semantic elements until the amount of bandwidth available is exhausted.

5. The method of claim 1, further comprising:
   assigning a privacy marker to the one or more semantic elements, the privacy marker requiring the remote device to have a corresponding permission to access a semantic element of the one or more semantic elements.

6. The method of claim 5, wherein the semantic element comprises an identifier of a person or object.

7. The method of claim 5, further comprising performing end-to-end encryption of the one or more semantic elements associated with the privacy marker.

8. The method of claim 1, wherein the determined channel quality level is a predicted channel quality level, the method further comprising:
   receiving an actual channel quality level at a time for transmitting the encoded video frame;
   determining that the actual channel quality level has a reduced quality relative to the predicted channel quality level;
   removing one or more semantic elements from the encoded video frame, based on one or more priority rules or by changing one or more configurable frame rates for semantic elements; and
   preparing the encoded video frame for transmission without the removed one or more semantic elements.

9. The method of claim 1, wherein the encoded video frame comprises data of the STS only without video frame data.

10. The method of claim 1, wherein the encoded video frame comprises data of the STS with a full compressed video frame or by attaching one or more portions of the video frame.

11. One or more processors configured
    to perform operations comprising:

determining a quality level for a channel for a time period in which a video frame is being transmitted over the channel;

determining, based on the quality level, one or more semantic elements to include in a semantic transcript stream (STS);

encoding the video frame with the one or more semantic elements of the STS; and preparing the encoded video frame for transmission to a remote device.

12. The one or more processors of claim 11, wherein determining the quality level comprises:

monitoring channel features comprising one or more of a size of upload grants, a measurement for a handover, or a reference symbol; and generating a prediction of an upload data rate for transmitting the video frame.

13. The one or more processors of claim 11, wherein determining one or more semantic elements to include comprises determining a number of annotations for extracting from the video frame.

14. The one or more processors of claim 11, wherein determining one or more semantic elements to include comprises determining an amount of bandwidth available for semantic elements;

assigning each semantic element a priority; and including higher priority semantic elements until the amount of bandwidth available is exhausted.

15. The one or more processors of claim 11, the operations further comprising:

assigning a privacy marker to the one or more semantic elements, the privacy marker requiring the remote device to have a corresponding permission to access a semantic element of the one or more semantic elements.

16. The one or more processors of claim 15, wherein the semantic element comprises an identifier of a person or object.

17. The one or more processors of claim 15, further comprising performing end-to-end encryption of the one or more semantic elements associated with the privacy marker.

18. The one or more processors of claim 11, wherein the determined channel quality level is a predicted channel quality level, the operations further comprising:

receiving an actual channel quality level at a time for transmitting the encoded video frame;

determining that the actual channel quality level has a reduced quality relative to the predicted channel quality level;

removing one or more semantic elements from the encoded video frame, based on one or more priority rules or by changing one or more configurable frame rates for semantic elements; and preparing the encoded video frame for transmission without the removed one or more semantic elements.

19. The one or more processors of claim 11, wherein the encoded video frame comprises data of the STS only without video frame data.

20. The one or more processors of claim 11, wherein the encoded video frame comprises data of the STS with a full compressed video frame or by attaching one or more portions of the video frame.

* * * * *